(12) United States Patent
Findikli et al.

(10) Patent No.: US 8,351,914 B2
(45) Date of Patent: Jan. 8, 2013

(54) METHOD AND SYSTEM FOR REGISTRATION OF LICENSED MODULES IN MOBILE DEVICES

(75) Inventors: Nadi S. Findikli, Cary, NC (US); Daniel Paul Homiller, Cary, NC (US)

(73) Assignee: Sony Mobile Communications AB, Lund (SE)

( * ) Notice: Subject to any disclaimer, the term of this patent is extended or adjusted under 35 U.S.C. 154(b) by 814 days.

(21) Appl. No.: 10/604,982

(22) Filed: Aug. 29, 2003

(65) Prior Publication Data

US 2005/0048971 A1   Mar. 3, 2005

(51) Int. Cl.
| | |
|---|---|
| H04M 3/00 | (2006.01) |
| H04M 11/00 | (2006.01) |
| H04W 4/00 | (2009.01) |
| H04L 9/32 | (2006.01) |
| G06F 17/30 | (2006.01) |

(52) U.S. Cl. ........ 455/418; 455/419; 455/466; 455/411; 713/168; 726/26; 370/338

(58) Field of Classification Search ............... 455/435.1, 455/466, 418, 419, 410, 411; 379/93.01, 379/93.26, 93.28, 100.17, 283, 355.02, 355.06, 379/357.03, 361; 713/168; 726/26; 370/338
See application file for complete search history.

(56) References Cited

U.S. PATENT DOCUMENTS

| | | | | |
|---|---|---|---|---|
| 5,148,472 | A | * | 9/1992 | Freese et al. .................. 455/408 |
| 5,517,568 | A | * | 5/1996 | Grube et al. .................. 380/250 |
| 5,794,142 | A | | 8/1998 | Vanttila et al. |
| 6,151,707 | A | * | 11/2000 | Hecksel et al. ............... 717/178 |
| 2001/0011253 | A1 | * | 8/2001 | Coley et al. ...................... 705/59 |
| 2002/0032664 | A1 | * | 3/2002 | Ikuta .............................. 705/73 |
| 2002/0083003 | A1 | | 6/2002 | Halliday et al. |
| 2002/0087489 | A1 | * | 7/2002 | Iizuka ........................... 705/400 |
| 2002/0157002 | A1 | * | 10/2002 | Messerges et al. ........... 713/155 |
| 2002/0160752 | A1 | | 10/2002 | Hook et al. |
| 2002/0162016 | A1 | * | 10/2002 | Colvin .......................... 713/200 |
| 2003/0143952 | A1 | | 7/2003 | Haller et al. |

(Continued)

FOREIGN PATENT DOCUMENTS

EP   1246428   10/2002

(Continued)

OTHER PUBLICATIONS

Written Opinion, PCT/IB2004/01354, Sony Ericsson Mobile Communications AB, Sep. 22, 2004.

(Continued)

Primary Examiner — Ariel Balaoing
(74) Attorney, Agent, or Firm — Patrick B. Horne; Moore & Van Allen PLLC

(57) ABSTRACT

Method and system for registration of licensed modules in mobile devices. The present invention provides for a registration system to determine active use of licensed modules installed in mobile devices such as wireless cellular terminals and PDA's. The registration system can be made to operate in a manner that is substantially transparent to the user of the mobile device. In example embodiments, a module handler within the processor platform of the mobile device collects module parameters as necessary and causes registration messages to be assembled and sent. In some embodiments, encryption is provided. User interaction with the registration process can also optionally be accommodated. Additionally, the module handler can direct that use of the software module or package is restricted until an acknowledgement is returned from the module activation system, confirming the registration.

30 Claims, 4 Drawing Sheets

U.S. PATENT DOCUMENTS

| | | | |
|---|---|---|---|
| 2003/0224823 A1* | 12/2003 | Hurst et al. | 455/558 |
| 2004/0107368 A1* | 6/2004 | Colvin | 713/202 |
| 2004/0176080 A1* | 9/2004 | Chakravorty et al. | 455/414.1 |

FOREIGN PATENT DOCUMENTS

| | | |
|---|---|---|
| JP | 2002014739 A | 1/2002 |
| JP | 2002258970 A | 9/2002 |
| JP | 2002373080 A | 12/2002 |

OTHER PUBLICATIONS

International Search Report, PCT/IB2004/01354, Sony Ericsson Mobile Communications AB, Sep. 22, 2004.

Sony Ericsson Mobile Communications AB, "International Preliminary Report on Patentability," Mar. 9, 2006.

Sony Ericsson Mobile Communications AB, Japanese Office Action issued in corresponding Japanese Patent Application No. 2006-524431, Feb. 20, 2009.

Indian Patent Office, First Examination Report, Jan. 29, 2010, 2 pgs.

State Intellectual Property Office, P.R. China; Notice of Reexamination; Nov. 22, 2010; issued in Chinese Patent Application No. 200480018341.6.

Patent Reexamination Board of the State Intellectual Property Office, P.R. China; Reexamination Decision; Nov. 30, 2011; issued in Chinese Patent Application No. 200480018341.6.

European Patent Office; Communication Pursuant to Article 94(3) EPC; Jan. 17, 2012; issued in European Patent Application No. 04728217.3.

* cited by examiner

METHOD AND SYSTEM FOR REGISTRATION OF LICENSED MODULES IN MOBILE DEVICES

BACKGROUND OF INVENTION

Wireless, mobile devices are continually evolving towards higher data rates and greater processing power. With these capabilities, an endless variety of functions and features can be realized through the installation of software or firmware modules within mobile devices such as wireless phones and personal data assistants. These software modules can be used for functions related to playing music, communicating with video or graphics, or even basic security or access algorithms to allow a mobile device to be used in multiple types of networks, or internationally.

Software packages or modules such as those just discussed are frequently developed by third party companies and are licensed to mobile device manufacturers for inclusion in mobile devices. The types of commercial agreements regarding the use of a software module provided by its author to a mobile device manufacturer include but are not limited to agreements specifying outright purchase of the module, exclusive licensing of the module, a one time payment by the device manufacturer for nonexclusive use of the module, or payment by a device manufacturer for each device which contains the module. While any of these alternatives are viable where the software module package provides basic functionality, or a feature that is expected to be widely used, such agreements are less than optimum where the module is not expected to be used by a majority of purchasers of a mobile device, or when end-user interest is difficult to predict prior to wide-spread distribution of the mobile device. It will often be desirable for a mobile device manufacturer to advertise and offer the function provided by the software module but ideally the manufacturer would not pay a licensing fee for "dormant" modules which are not used. For example, a module for decoding compressed music, such as MP3 files, may only be used by a small number of users who subscribe to a music download service. If this is the case, the mobile device manufacturer would in an ideal arrangement not have to pay for all of the unused modules, despite the fact that the module is installed in each of the distributed mobile devices.

SUMMARY OF INVENTION

The present invention provides for a registration system which measures active use of licensed modules installed in mobile devices. The registration system can be made to operate in a manner that is substantially transparent to the user of the mobile device. In some embodiments, a mobile device containing a radio frequency block and a processor platform which controls its operation, includes one or more licensed modules. One or more of these licensed modules contains module parameters, in some embodiments within a module header. The module parameters include at least a module identifier, and may include additional information to aid in the operation of the invention. These additional parameters may include an indication of whether the module has been previously activated for licensing purposes, and possibly a server address to which to send a registration message which is used to track module use. A module handler within the processor platform of the mobile device processes module parameters as necessary and causes registration messages to be assembled and sent. The registration messages include a module ID and may also include a device ID, time parameters, and additional information.

According to embodiments of the invention, the mobile device detects when a licensed module is being initially accessed by a user of the mobile device. Module parameters are collected, wherein the module parameters include at least a module identifier so that it will be known for which module a payment is triggered. A registration message is assembled including the module identifier, a destination address to which the message should be routed, and possibly other information. This registration message is sent to an activation system over a telecommunication network.

In some embodiments, encryption of the registration message is provided to prevent fraudulent registration messages from being sent to the activation system. The encryption techniques may be any of those widely known, including but not limited to hashing algorithms such as SHA-1 or MD-5, encryption algorithms such as DES, AES, RC4, or RC5, and may include the use of a digital signature, using an algorithm such as RSA or ECC, based upon a key or device identification parameter unique to each mobile device or to a set of mobile devices.

Additionally, the module handler can direct that use of the software module or package is restricted until an acknowledgement is returned from the module activation system. This restriction may prevent any use of the module until the acknowledgement is received, or may allow use for a limited time or for a limited number of uses unless the acknowledgement is received. The acknowledgement message may be encrypted by the activation system in a similar manner as described above.

It is also possible to program the processor platform within the mobile device to interact with the user during the process, or not, depending on the particular needs of the device maker and module supplier, or to comply with regulatory requirements. For example, if billable resources are to be used to send the message, it may be necessary to prompt the user for permission.

Registration messages, and optional acknowledgement messages, can be sent and received using any of various formats and protocols for data communication supported by the mobile device and the telecommunication network. These include but are not limited to, short message service (SMS), wireless application protocol (WAP), hyper-text transport protocol (HTTP), and the use of a normal telephone connection. In the normal telephone connection scenario, the mobile device might dial a telephone number and the registration information could take the form of a series of dual-tone multi-frequency (DTMF) tones. Alternatively the mobile device may establish a wireless data session using any of a number of data communications standards including the GSM Packet Radio Service (GPRS), circuit-switched data (CSD), etc.

In any case, the module handler within the mobile device, as well as the module activation system, form the means to carry out the invention. The module activation system includes a network interface which can receive and send registration messages and acknowledgement messages, optionally provide for encryption and decryption, and provide a data repository which stores module parameters received in registration messages so that a count and database of active licensed modules can be maintained. The module activation system may also provide facilities for sorting data in the database, based on selected parameters, to produce reports, which reports may optionally be forwarded to other servers or client terminals using known methods such as e-mail, FTP, HTTP, etc.

DETAILED DESCRIPTION

Figure 1:
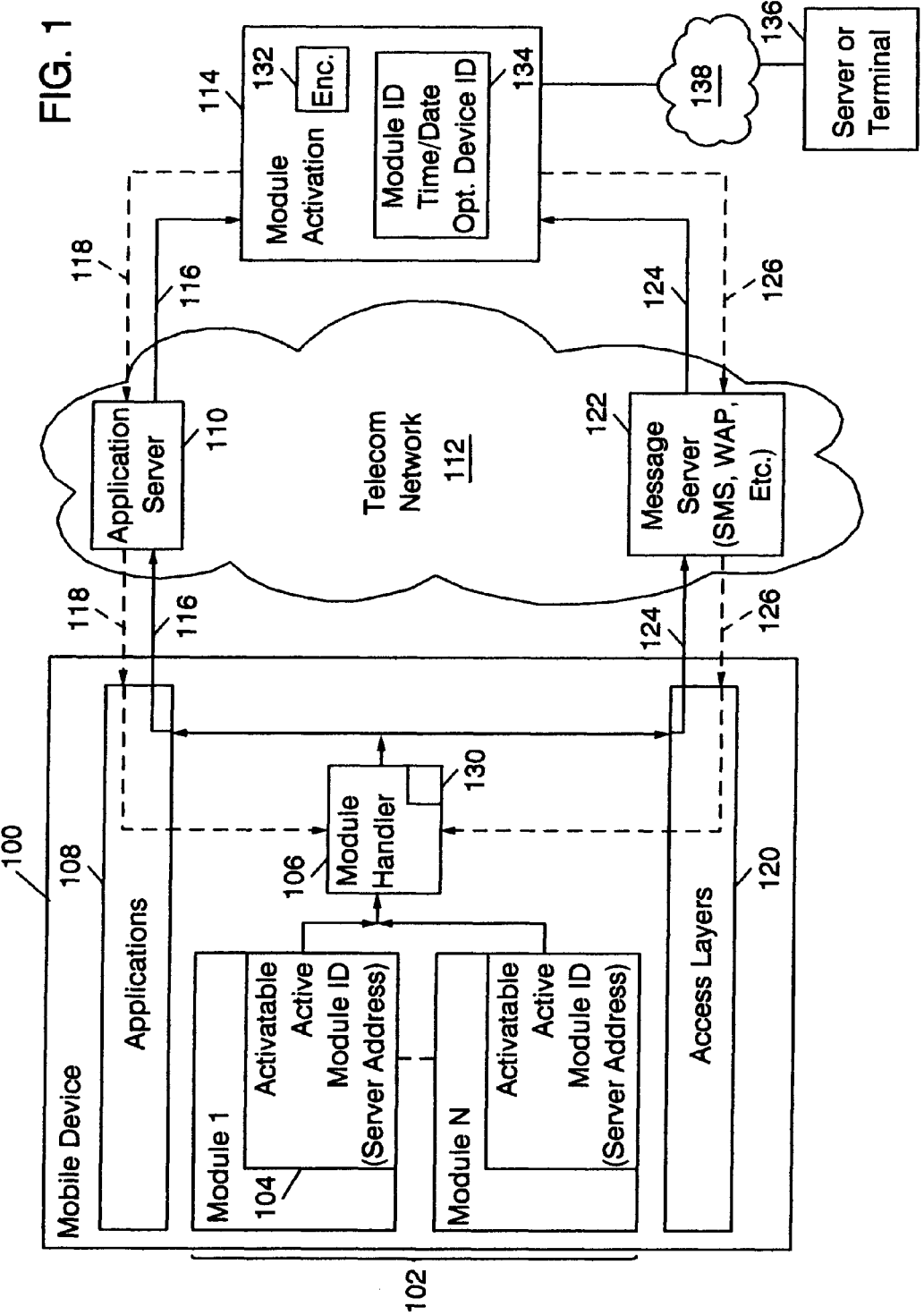
FIG. 1 is a network block diagram which illustrates the operation of the invention, including some of the details within a mobile device, and a module activation system according to the invention.

The invention described herein, in some embodiments, makes use of existing capabilities within common mobile devices to inform a central server or other type of module activation system of a particular mobile device using or accessing a module for the first time. In the example embodiments, the system does not require permission from the server to use the module or software package, making it possible to design a registration process that is transparent to the user. The registration functionality in a particular mobile device is expandable to any number of modules or software packages and the method of registering the modules does not require scaling in size with the number of modules to which it is applied. Registration can also be applied to software modules included by the mobile device manufacturer; it is not restricted to third party modules.

The meaning of certain terms as used in the context of this disclosure should be understood as follows. The term "activation" and similar terms are, in most cases, intended to apply to the process of recognizing that a particular module or software package in a mobile device is now being used and is therefore "counted" for licensing purposes. The term "registration" refers to the actual communication with a module activation system in order to record the fact that the module has begun to be used by a user. Contrast these terms with terms such as "accessing" a module and "using" a module, which are used to refer to the normal use of the module in repeated operations of the mobile device. Thus, it can be said that activation and registration occur when a licensed module is accessed or used initially, or for the first time by a user.

The term "header" is used to refer to the portion of a module or software package which is stored in firmware or memory which includes the various module parameters needed to carry out activation and registration. The term "header" is used for convenience, and is not meant to limit this function to any particular data structure or data format.

A "mobile device" as referred to in the context of this disclosure may be a traditional cellular telephone, mobile terminal, wireless terminal, and the like as well as a personal communication system, personal computer, or personal data assistant (PDA). Indeed, many kinds of devices can be "mobile devices" as long as they include a way to access a telecommunication network, either wireless or wired. Telecommunication network in this context is meant to include data communications networks, even if such network does not support voice telephony functions. A "module registration system" or "module activation system" simply refers to the functionality connected to the telecommunication network which receives registration messages, in some embodiments sends acknowledgement messages, and in general counts the number of registered modules of a particular type. This functionality can be implemented either in a dedicated server, or as part of the function of a server which also serves other purposes. Database in this context refers to information pertaining to modules (which are being tracked by the system) and registrations (lists and/or statistics on devices that have registered with the system as well as information on the actual registrations such as time, date, etc.).

As previously discussed, in some embodiments of the invention, each mobile device contains one or more licensed modules which are included in the device software or firmware. The software can be contained in general use memory such as RAM, or in a dedicated chip such as an application specific integrated circuit (ASIC), or even stored on media such as an optical or magnetic disk. For a small mobile terminal, such a media might take the form of a so-called "micro-drive" as is commonly used in digital photography and music devices, or might take the form of a memory card, such as Sony's Memory Stick or the Multi-Media Card (MMC). In order to implement example embodiments of the invention, each module has a header, which includes information or module parameters such as shown in the following table. Each type of information is listed in the tables below as being mandatory or optional under certain circumstances. A header according to the invention could contain additional information. The following is shown by way of example only. The parameters are listed in the first column and include whether the module is activatable at all according to the invention, whether the module has already been activated, the module ID, and an optional server address, which will be discussed in further detail later. The value column shows the kinds of stored values each parameter would have in an actual implementation, and the final column indicates whether a parameter is mandatory or optional in an actual implementation. This information may be distributed between modifiable (data) memory and non-modifiable (program) memory. Some parameters are repeated between per-module and per-mobile sets. It may be decided at design time which one to use, or the per-mobile parameters may provide default values to be optionally overridden by per-module parameters. The per-mobile information may be stored centrally rather than in module headers.

| Per-module information | | |
|---|---|---|
| PARAMETER | VALUE | MANDATORY OR OPTIONAL |
| Activatable | Yes, No | Mandatory |
| Activated | Yes, No | Mandatory if Activatable = Yes |
| Module ID | Unique Identification No. | Mandatory if Activatable = Yes |
| Server Address | Path-dependent address | Optional |
| Wait-for-ack | Yes, No | Optional |
| Inform user | Yes, No | Optional |

Note that the mere lack of an "Activatable" parameter associated with a given licensed module may indicate that the module is not activatable (i.e. "Activatable"=No).

| Per-mobile information | | |
|---|---|---|
| PARAMETER | VALUE | MANDATORY OR OPTIONAL |
| Mobile ID | Unique Identification No. | Mandatory if activatable = Yes |

-continued

Per-mobile information

| PARAMETER | VALUE | MANDATORY OR OPTIONAL |
| --- | --- | --- |
| Server Address | Path-dependent address | Optional |
| Preferred path | Path indicator | Optional |
| Inform user | Yes, No | Optional |

FIG. 1 illustrates a mobile device, 100, which includes a plurality of modules, 102, the first module being labeled module 1, and the last module being labeled module N. Each module contains a header such as header 104 in module 1. When a module is accessed for the first time, the header is processed by module handler 106. The module handler first checks to see if the module is activatable, that is if it is a licensed module which makes use of the registration system according to the invention. The module handler then checks to see if the module is "active" or "activated," meaning if it has already been activated through registration or not. If the module is activatable but is not active, the handler will perform an activation, and then mark the module header as activated so that it is known that the module has already been registered and does not need to be activated the next time it is accessed.

The module handler will assemble and cause to be sent a registration message. This registration message could be sent through the application layers, 108 of the mobile device and an application server, 110 in telecommunication network 112. In this case the registration message would then be communicated to module activation system 114 as shown at 116. Optionally, an acknowledgement can be returned at 118. Alternatively, the registration message can be communicated through access layers 120 for a messaging system such as a short message service (SMS). In this case, a message server 122 forwards the registration message to module activation system 114 as shown at 124. Again, an acknowledgement as shown at 126 would be optionally returned all the way back to the module handler. Optionally, a delivery path parameter stored in the mobile may indicate which delivery path to use. This parameter may be set for the mobile terminal, or it may be set for each individual module. In the latter case, the delivery path parameter may be among the module parameters in the header. In any case, encryption capabilities are optionally built into the module handler.

Note that one type of message that is suited to being a registration message according to embodiments of the invention is a post message according to the wireless application protocol (WAP). WAP is the messaging protocol specified for use in the so-called "wireless web" and it is promulgated by the Wireless Application Protocol Forum. Post messages are specified in various standard specifications published by the forum. WAP could also be used to deliver the registration message by having the mobile access a special WAP web page and deliver the information using form entry methods and standard protocols. It should be noted that registration messages and acknowledgement messages as discussed later are not limited to wireless data protocols. Indeed, the registration messages could be delivered by having the mobile device dial a special number and make a standard telephone connection with the number. At this point, a data session can be established using any of several known techniques, or a special sequence dual-tone multi-frequency (DTMF) signals selected to encode the information required might be transmitted over the telephone connection.

When an activation routine is run in the mobile device, the handler collects information related to the module, at least in part from the module header, including, but not limited to the module identifier and the activation time and date (typically the current time and date can be obtained internally to the mobile or from the system rather than from a module header). Optionally, additional information can be gathered and included in the registration message, including a mobile device ID, and an address to which to send the registration message. Note that in the case of a registration through a telephone connection as previously described, a telephone number is the address. The handler then assembles the message and sends it to the appropriate server or address where the information will be gathered by the module activation system.

Encryption of all or part of the registration message may optionally be used, according to known standards. This encryption may be additional to encryption built in to standard wireless protocols. It may be desirable for all or part of the registration message to be encrypted using a key derived from any identification number unique to the mobile device generating the registration message, for example, by using the private key from a public/private key pair used for asymmetric encryption (using, for example, the RSA or ECC algorithms). In this manner, the message ultimately received at the registration service is signed by the individual mobile device, allowing the module activation system to track activation of individual devices, or perhaps more importantly to detect multiple registrations from the same device.

In addition to or instead of the signature process just described, it may be desirable for all or part of the registration message to be encrypted using a key associated with the module activation system. In this case, the mobile device may have been programmed with a public key from a public/private key pair used for asymmetric encryption (using, for example, the RSA or ECC algorithms). The portion of the registration message encrypted using this public key can only be decrypted using the associated private key, which should be carefully protected in or at the module activation system.

Alternatively, all or part of the registration message may be encrypted using symmetric encryption (using an algorithm such as RC-5, AES, DES, etc.), using an encryption key stored or generated in the mobile device. In one case, the mobile device may be pre-programmed with an encryption key, which is also known to the module activation system and used for decrypting received registration messages. In another case, algorithms such as the Diffie-Hellman algorithm may be used to generate an encryption key for temporary use. However, this latter approach requires a series of messages to be passed between the mobile device and the module activation system simply to generate the shared secret key.

In addition to the techniques discussed above, methods for securing the registration message might include the use of hashing algorithms (such as SHA-1 and MD-5) in order to ensure the integrity of encrypted messages, and the use of nonces to prevent spoofing via the retransmission of previously transmitted messages. (A nonce is a parameter included in the message that changes over time, so that each encrypted message is unique, even if all other data in the message is the same. This technique prevents a third party from intercepting an encrypted message and transmitting multiple copies to the intended recipient, thus confusing the recipient.) In general the previously discussed security measures will prevent malicious tampering with registration records, which might otherwise have the effect of running up license fees for the mobile device manufacturer. Encryption capabilities are, in most cases, built into the module handler. The optional encryption in the module handler is illustrated at 130 in FIG. 1.

Example embodiments of the invention have a number of optional features and enhancements that could be easily envisioned by those skilled in the art. In the disclosed embodiments so far, it has been assumed that a registration message is sent, and the user is permitted to then access, run, and use the software module in question. However, optionally, the header may indicate that activation must be completed prior to allowing the module to run for the first time. This is accomplished by requiring an acknowledgement message from the module activation system, which may in most cases be returned over the same path that the registration message took. These optional acknowledgement messages are shown at 118 and 126 in FIG. 1. Typically, a user would be informed of this process in this case. This presentation to the user would at least in part defeat the transparency of the registration process, but this approach may be required in certain business situations. It is also possible to schedule the activation to be performed at a later time, or run the activation as a lower priority process in the mobile device relative to the application using the module, and even to other applications running in the mobile device. Note that in the simplest case, it is assumed that the level of transmission guarantee by the means used to deliver the activation message will be sufficient to assume activation. For example, SMS provides a low layer acknowledgement that a message was delivered to the infrastructure. This type of acknowledgement is separate from the acknowledgement message referred to herein, which is specifically sent out by the module activation system.

It may be required by legal or regulatory bodies or desired by the device manufacturer to interact with the user before or during activation in some cases. For example, in cases where the activation will use billable resources, such as airtime, an interaction can be used to ask permission from the user or seek user approval of the sending of the registration message (and possibly the subsequent receipt of any acknowledgement message). Any interaction with the user, either an informational message, or a request for input, is handled through the normal input/output mechanisms of the mobile device in question.

Figure 2:
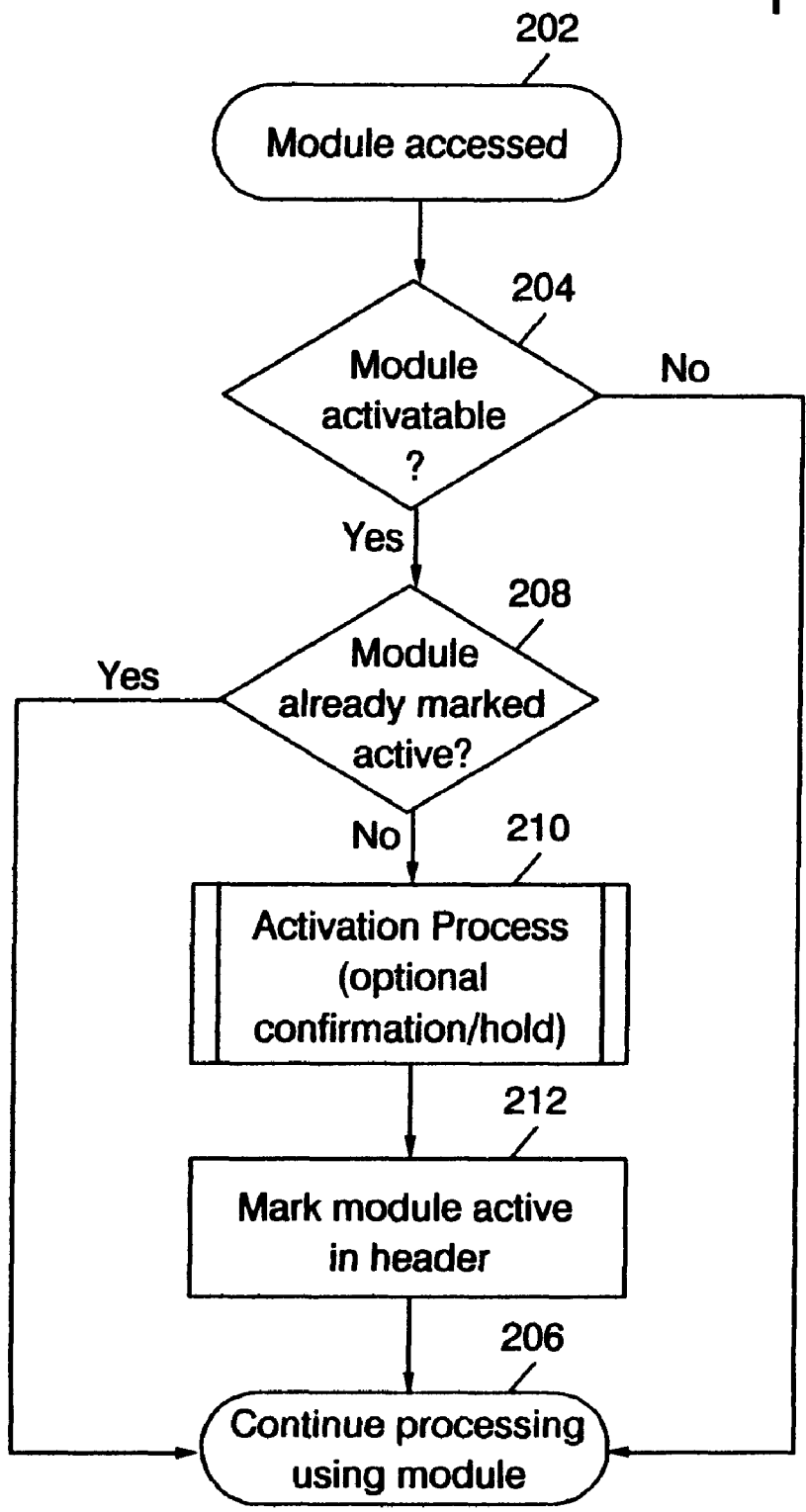
FIG. 2 is a flowchart which illustrates the method used in certain embodiments of the invention.
Figure 3:
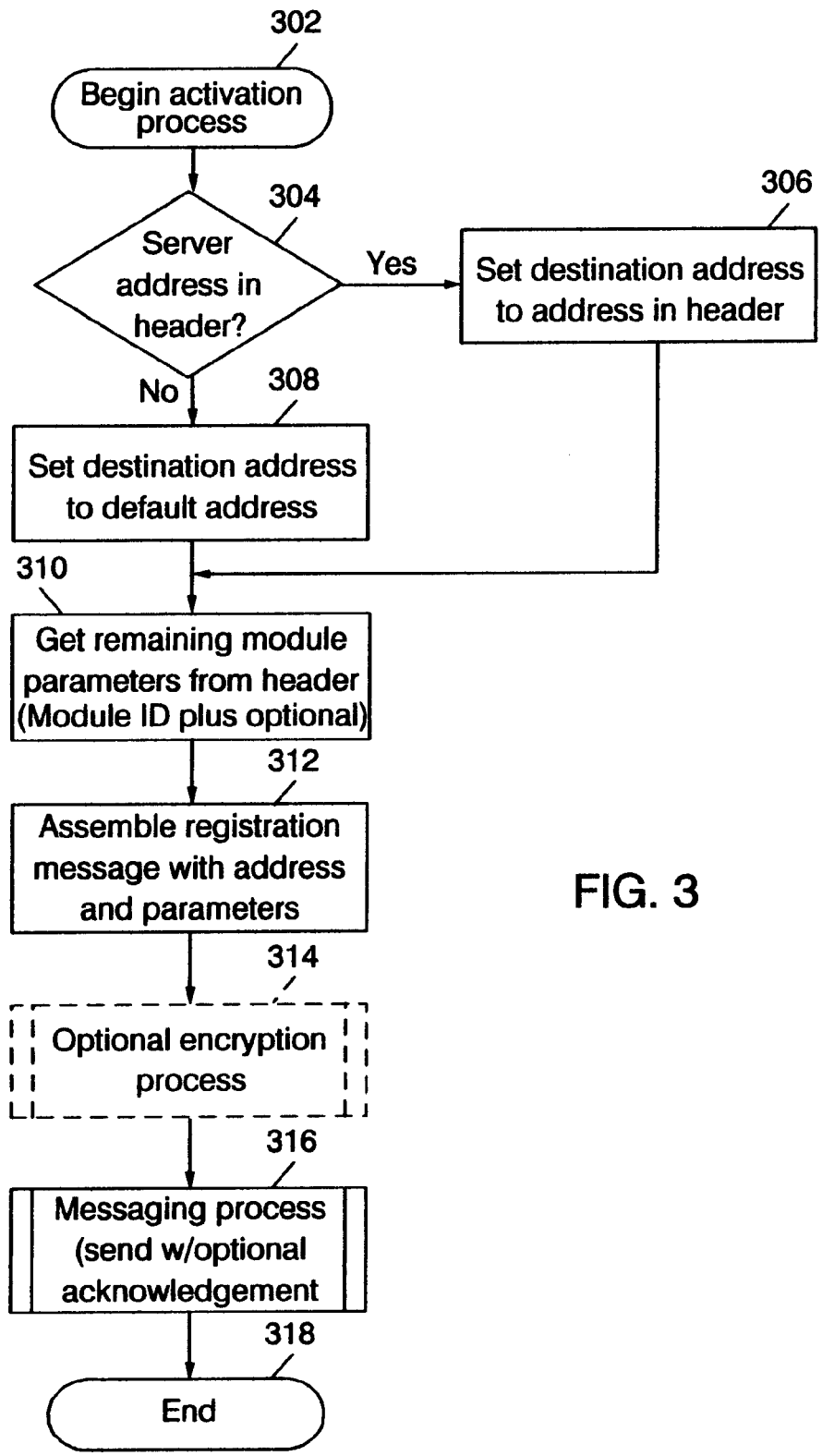
FIG. 3 is an additional flowchart which shows further detail of the method used to implement embodiments of the invention.

FIGS. 2 and 3 illustrate the activation process in flowchart form, according to example embodiments of the invention. Turning to FIG. 2, a module is accessed at step 202. The header is checked to determine if the module is activatable according to the registration process described herein. This check is made at step 204. If the module is not activatable, it is accessed and used in the normal manner; processing continuing at step 206. However, if the module is activatable, a check is made at step 208 to determine if the module has already gone through the activation process. If the answer is yes, processing continues, accessing and using the module at step 206 as before. If the answer is no, however, the activation process is executed at step 210. Note that the effect of steps 202, 204, and 208 is to detect that a licensed module is being initially accessed by a user of the mobile device. If this access is the initial access, and if the module is a licensed module with which the registration process specified herein can be used, the activation process takes place at step 210. Once the activation process has been initiated, and in some cases after it is complete, the module is marked activated in the header at step 212. Note that the activation process 210 includes optional confirmation via interaction with the user, and optionally placing the operation of the module on hold until activation is confirmed. If operation of the module is placed on hold in this manner, its operation is suspended at least in part pending receipt of the acknowledgement message. It should be noted that this may be done selectively. That is, the device manufacturer or module supplier may choose to suspend operation in whole or in part depending on the particular module being registered. If this option is not selected, the mobile device may still be programmed to wait for an acknowledgement message, and attempt retries of the registration message if the acknowledgement message is not received in a certain time. Operation of the software module need not necessarily be suspended.

FIG. 3 illustrates a more detailed flowchart of the activation process shown at 210 of FIG. 2. At step 302 the activation process begins. In this embodiment, the module handler checks the header of the module to determine if a specific server address is specified at step 304. This step is optional, that is, some embodiments of the invention may not check for a server address in the module header, but rather use the same address to register all modules. If a destination address is contained in the header as a stored value within the module parameters, the address for the registration message is set to that stored value at step 306. If there is no destination address stored, the address is set to a default value at step 308. It should be noted that this destination address may be a simple telephone number in the case where the registration message is a series of tones played during a normal telephone call over a standard telephone connection.

At step 310, the remaining module parameters are read from the module header. At a minimum, these parameters include the module ID so that it is known which software module is being registered as activated. Module parameters may also include an identifier for the mobile device in which the activation is taking place. In fact, the module parameters, whether or not stored in the form of a header, can include any information that either the device manufacturer or module provider wishes to have provided at the time of registration. At step 312 the registration message is assembled with a destination address and appropriate parameters. It should be noted that in the case of a telephone registration as previously discussed, the destination address is a telephone number. Thus, the registration message can be thought of as the combined information, stored in device memory, of the telephone number to be dialed, and the stream of tones to be sent to the server to carry the appropriate information regarding module activation. This is in contrast to the situation where a message being sent from a mobile device includes a destination address, which is used for purposes of routing through the network.

At step 314 an optional encryption can be performed on the registration message before being transmitted by the mobile device. At step 316 the messaging process takes place. This includes at a minimum the sending of the registration message, or at least the portion of the registration message containing the registration information (as in the case with a telephone registration). The messaging process can also include the receipt of an acknowledgement message as previously discussed. The activation process ends at step 318.

Returning briefly to FIG. 1, the optional encryption illustrated in the flowchart at FIG. 3 is performed by routine 130 within the module handler. A decryption system with decryption capabilities corresponding to any encryption employed in the mobile device must also be contained in the module activation system, as shown at 132. This encryption can be of many types as previously discussed. Encryption of any acknowledgement messages may also be performed at the module activation system, using any of the techniques previously discussed, in which case corresponding decryption capabilities must be included in the mobile device and employed in the messaging process upon receipt of an acknowledgement message by the mobile device.

Also, with respect to FIG. 1, activation system 114 includes a network interface, which varies depending on the type of messaging used. Network interfaces are shown conceptually by way of the messages 116 and 124 being input to the module activation system and messages 118 and 126 being output from the module activation system. In example embodiments, the module activation system also includes a data repository 134. This data repository stores module parameters received in registration messages. The module parameters comprise module identifiers, and also typically time parameters which consist of time and/or date stamps for module activations, all stored so that a count of active license modules can be maintained. In some embodiments, a time stamp is included in the assembled message by the mobile device, so that the time stored in the data repository of the activation system represents the time of activation at the mobile device. (Note that this time stamp may be useful as the nonce in encrypting a registration message as discussed above.) In other embodiments, a time stamp is included by the module activation system. In such embodiments, the time stamp represents the time that the activation message is actually received. It could also represent the time that an acknowledgment message is sent.

As previously discussed, the module activation system may communicate with mobile devices through an application server, as shown at 110, or a message server, as shown at 122. It is also possible to have a module activation system that communicates multiple ways, and can accept activation messages and send acknowledgements via various protocols, including WAP and SMS.

The module activation system may also provide various facilities for managing and processing the data contained in the data repository. These facilities may include the ability to sort all or part of the data based on selected parameters such as module ID, module type, mobile ID, mobile type, time and date, etc. The module activation system may also be capable of generating reports based on this sorting or filtering of data, or simply based on the number of registrations performed for a particular module or set of modules. Finally, the module activation system may provide facilities for transmitting such reports (either automatically or upon the command of an operator) to another server or client terminal, 136, connected in any of a variety of known ways (e.g. Ethernet, Internet) to the module activation system. In the example of FIG. 1, this connection is shown through network 138. This transmission may be by any of several known means, including electronic mail, FTP (file transfer protocol), HTTP, etc.

Figure 4:
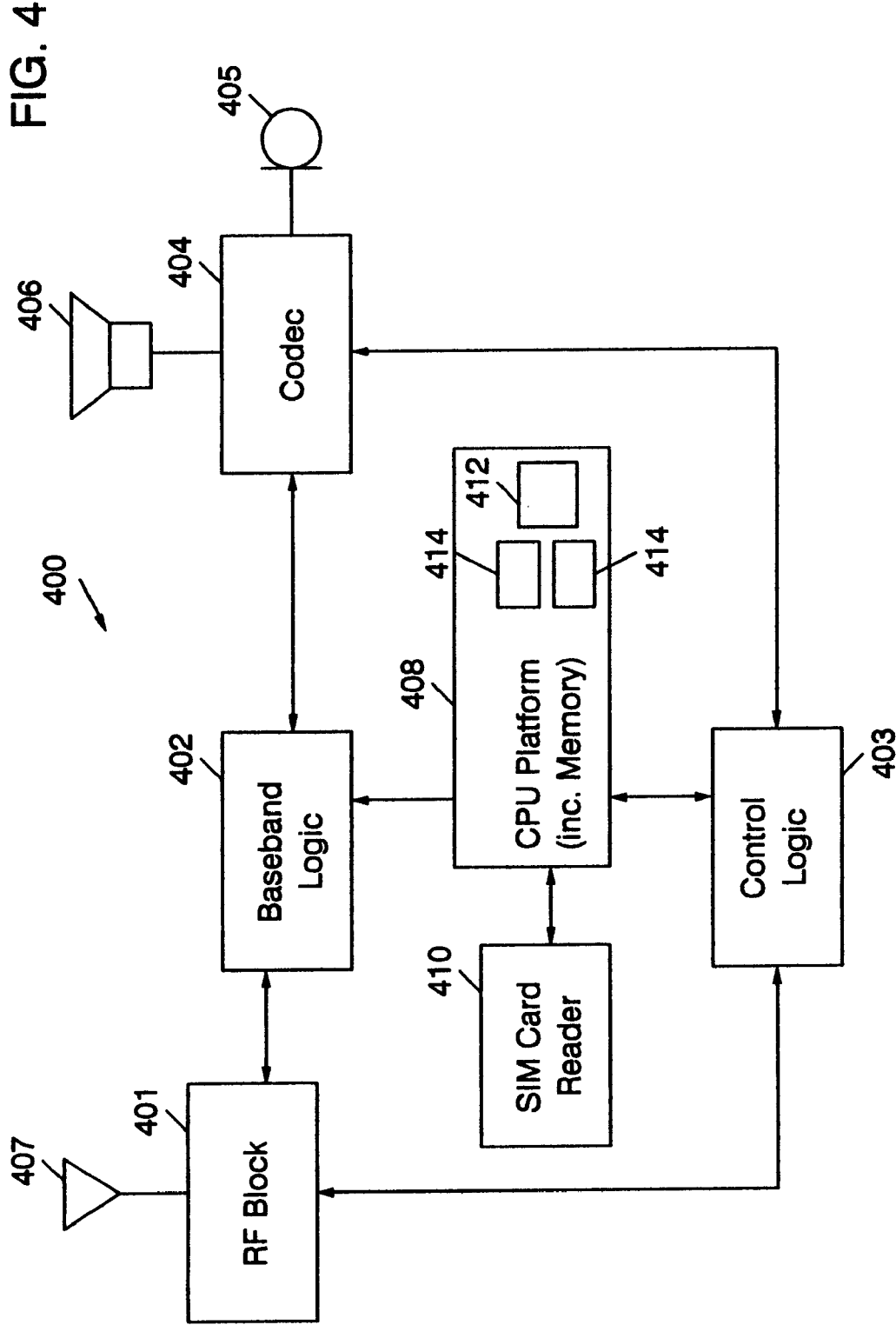
FIG. 4 is a block diagram of a mobile phone type of mobile device which implements certain aspects of some embodiments of the invention.

FIG. 4 is a block diagram of one type of mobile device that implements embodiments of the invention. FIG. 4 illustrates a typical mobile telecommunication terminal, 400, of the "cellular telephone" type. Such a mobile terminal could operate according to any of various known standards, for example, the global system for mobile (GSM) standards or the code division multiplex access (CDMA) standards. This illustration is for example purposes only, and many terminals of substantially different configurations can be used and the invention will work as previously described. The mobile terminal of FIG. 4 includes traditional mobile terminal elements which work together to implement communications functions with a public, wide area, wireless network. These include radio frequency (RF) block 401, control logic block 403, and a local audio codec, 404, for interface with microphone and speaker elements. Within radio block 401, receive and transmit information is converted from and to the appropriate radio frequencies and filtering using baseband or intermediate frequency circuitry is applied, as is understood in the art. Information transmitted and received includes the registration and acknowledgement messages according to the invention. Antenna system 407 is connected to RF block 401. In baseband logic block 402, basic signal processing occurs, including, for example, synchronization, channel coding, decoding, and burst formatting, as is understood in the art. Codec 404 handles voice input through microphone 405 and produces output through speaker 406. Functions of the transceiving blocks as just discussed are directed or controlled by one or more microprocessors or digital signal processors and associated memory shown as processor platform 408 for illustrative purposes. The mobile terminal of this example accepts a subscriber identity module (SIM) card at a SIM card reader interface 410. Control logic 403 controls human interface components such as a keyboard and a liquid crystal display, which are not shown for clarity. Because the terminal of FIG. 4 is implementing the invention, the processor platform includes module handler 412 and software application modules 414. In this particular example, the processor platform of the terminal includes other code, not shown for clarity but as understood in the art, which aids in controlling the other various elements in order to form the means to carry out the various communication processes, including those of the invention.

Specific embodiments of an invention are disclosed herein. One of ordinary skill in the telecommunications and computing arts will quickly recognize that the invention has other applications in other environments. In fact, many embodiments and implementations are possible. The following claims are in no way intended to limit the scope of the invention to the specific embodiments described.

The invention claimed is:

1. A method of registering an activatable software package in a mobile device, the method comprising:
    detecting that a software package has been initially accessed by a user of the mobile device;
    determining whether the accessed software package is activatable;
    determining whether the accessed software package has previously been activated;
    allowing use of the activatable software package without requiring permission from a server to use the activatable software package;
    collecting module parameters;
    determining whether a module registration system address is one of the module parameters;
    in response to determining that the module registration system address is not one of the module parameters, setting a destination address to a default address;
    assembling a registration message in response to the detecting that the activatable software package has been initially accessed, the registration message comprising a message to record that the activatable software package has begun to be used; and
    sending the registration message from the mobile device to a module registration system, at the destination address, while allowing use of the activatable software package without requiring a response to the registration message.

2. The method of claim 1 further comprising encrypting the registration message prior to sending the registration message.

3. The method of claim 1 wherein the sending of the registration message further comprises sending the registration message using a short message service (SMS).

4. The method of claim 1 wherein the registration message is a wireless application protocol (WAP) message and the sending of the registration message further comprises sending the registration message to a WAP server.

5. The method of claim 1 wherein the message comprises a series of dual-tone-multi-frequency (DTMF) tones, the destination address is a telephone number, and the sending of the registration message further comprises making a telephone connection to the telephone number.

6. The method of claim 2 wherein the sending of the registration message further comprises sending the registration message using a short message service (SMS).

7. The method of claim 2 wherein the registration message is a wireless application protocol (WAP) message and the sending of the registration message further comprises sending the registration message to a WAP server.

8. The method of claim 2 further comprising selecting a delivery path for the registration message based on a delivery path parameter for the mobile device.

9. The method of claim 2 further comprising selecting a delivery path for the registration message based on a delivery path parameter from among the module parameters.

10. A mobile device operable to register an activatable software package included therein, the mobile device comprising:
at least one CPU processor configured for:
detecting that a software package has been initially accessed by a user of the mobile device;
determining whether the accessed software package is activatable;
determining whether the accessed software package has previously been activated;
allowing use of the activatable software package without requiring permission from a server to use the licensed software package;
collecting module parameters;
determining whether a module registration system address is one of the module parameters;
in response to determining that the module registration system address is not one of the module parameters, setting a destination address to a default address;
assembling a registration message in response to the detecting that the activatable software package has been initially accessed, the registration message comprising a message to record that the activatable software package has begun to be used; and
sending the registration message from the mobile device to a module registration system, at the destination address, while allowing use of the activatable software package without requiring a response to the registration message.

11. The mobile device of claim 10 further comprising means for encrypting the registration message.

12. A mobile device comprising:
a CPU processor;
a radio frequency (RF) block for sending messages over a telecommunication network; and
a processor platform for controlling the operation of the mobile device, the processing platform further comprising:
at least one activatable software package including module parameters;
a module to allow use of the activatable software package without requiring permission from a server to use the at least one activatable software package; and
a module handler operable to collect the module parameters, to determine whether a module registration system address is one of the module parameters, to set a destination address to a default address in response to determining that the module registration system address is not one of the module parameters, to cause a registration message to be assembled in response to:
detecting that a software package has been initially accessed by a user of the mobile device,
determining that the accessed software package is activatable, and
determining that the accessed software package has not previously been activated, the registration message comprising a message for the server to record that the activatable software package has begun to be used in order to enable the registering of the at least one activatable software package; and
wherein the processing platform is further operable to cause the mobile device to send the registration message through the RF block to a module registration system at the server at the destination address while allowing use of the activatable software package without requiring a response to the registration message.

13. The mobile device of claim 12 wherein the processor platform is further operable to cause encryption of the registration message prior to sending the registration message.

14. The mobile device of claim 12 wherein the registration message is formatted for a short message service (SMS).

15. The mobile device of claim 12 wherein the registration message is a wireless application protocol (WAP) message.

16. The mobile device of claim 12 wherein the message comprises a series of dual-tone-multi-frequency (DTMF) tones and the destination address is a telephone number.

17. The mobile device of claim 13 wherein the registration message is formatted for a short message service (SMS).

18. The mobile device of claim 13 wherein the registration message is a wireless application protocol (WAP) message.

19. The mobile device of claim 12 wherein the module handler is operable to retrieve a stored value for the destination address from the module parameters, and wherein the module handler further comprises a default value for the destination address.

20. The mobile device of claim 13 wherein the module handler is operable to retrieve a stored value for the destination address from the module parameters, and wherein the module handler further comprises a default value for the destination address.

21. The mobile device of claim 14 wherein the module handler is operable to retrieve a stored value for the destination address from the module parameters, and wherein the module handler further comprises a default value for the destination address.

22. The mobile device of claim 15 wherein the module handler is operable to retrieve a stored value for the destination address from the module parameters, and wherein the module handler further comprises a default value for the destination address.

23. The mobile device of claim 16 wherein the module handler is operable to retrieve a stored value for the destination address from the module parameters, and wherein the module handler further comprises a default value for the destination address.

24. The mobile device of claim 13 wherein the processing platform is further operable to select a delivery path for the registration message based on a stored delivery path parameter for the mobile device.

25. The mobile device of claim 13 wherein the module parameters further comprise a delivery path parameter.

26. A method of registering a licensed software package in a mobile device, the method comprising:
- detecting the licensed software package in a processing platform in the mobile device being accessed by a user of the mobile device;
- determining if the licensed software package is subject to activation for a registration process, and if so, determining whether or not the licensed software package has already been activated;
- allowing use of the licensed software package; and
- if the licensed software package has not already been activated:
  - collecting module parameters;
  - determining whether a module registration system address is one of the module parameters;
  - in response to determining that the module registration system address is not one of the module parameters, setting a destination address to a default address;
  - assembling a registration message in response to the detecting of the licensed software package has been accessed, the registration message comprising a message to record that the licensed software package has begun to be used; and
  - sending the registration message from the mobile device to a module registration system at the destination address while allowing use of the licensed software package.

27. The method of claim 26, wherein determining whether or not the licensed software package has already been activated comprises checking if a module has been marked as active.

28. The method of claim 26, wherein allowing use of the licensed software package takes place without requiring permission from a server to use the licensed software package.

29. The method of claim 26 further comprising encrypting the registration message prior to sending the registration message.

30. The method of claim 26 further comprising receiving an acknowledgement message from the module registration system.

* * * * *